United States Patent
Oberbeckmann

(10) Patent No.: US 10,239,493 B2
(45) Date of Patent: Mar. 26, 2019

(54) SECURITY METHOD FOR A SECURITY SYSTEM OF A VEHICLE

(71) Applicant: Huf Hülsbeck & Fürst GmbH & Co. KG, Velbert (DE)

(72) Inventor: Kai Magnus Oberbeckmann, Wuppertal (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/919,292

(22) Filed: Mar. 13, 2018

(65) Prior Publication Data
US 2018/0257605 A1  Sep. 13, 2018

(30) Foreign Application Priority Data
Mar. 13, 2017 (DE) .................. 10 2017 105 259

(51) Int. Cl.
*B60R 25/24* (2013.01)
*H04W 4/80* (2018.01)

(52) U.S. Cl.
CPC .......... *B60R 25/241* (2013.01); *B60R 25/245* (2013.01); *B60R 25/248* (2013.01); *H04W 4/80* (2018.02)

(58) Field of Classification Search
CPC ....... B60R 25/241; B60R 25/248; H04W 4/80
USPC ...................................... 340/426.11–426.17
See application file for complete search history.

(56) References Cited

U.S. PATENT DOCUMENTS

| 9,845,070 B2* | 12/2017 | Petel ..................... B60R 25/246 |
| 10,035,494 B2* | 7/2018 | Sute ........................ B60R 25/24 |
| 2012/0172010 A1* | 7/2012 | Oman ..................... G07C 5/008 455/414.1 |
| 2012/0313768 A1* | 12/2012 | Campbell ........... B60R 25/2009 340/438 |
| 2013/0017816 A1* | 1/2013 | Talty ..................... H04W 76/14 455/418 |
| 2013/0141212 A1* | 6/2013 | Pickering ........... G07C 9/00944 340/5.61 |
| 2013/0211623 A1* | 8/2013 | Thompson ............. G07C 5/008 701/2 |
| 2015/0028995 A1* | 1/2015 | Gautama ............... B60R 25/406 340/5.72 |
| 2015/0363988 A1* | 12/2015 | Van Wiemeersch ..... H04M 1/11 455/557 |

(Continued)

FOREIGN PATENT DOCUMENTS

| DE | 102013224330 | 7/2014 |
| EP | 3335942 | 6/2018 |
| WO | WO 2008/068091 | 6/2008 |

(Continued)

OTHER PUBLICATIONS

Europäischer Recherchenbericht and die Stellungnahme zur Europäischen Recherche [European Search Report and the European Search Opinion] dated Aug. 9, 2018 From the European Patent Office Re. Application No. 18160885.2 and Its Summary in English. (10 Pages).

*Primary Examiner* — Eric Blount

(57) ABSTRACT

The invention relates to a security method (100) for a security system (200) of a vehicle (1) for activating at least one security-related function in the vehicle (1) by means of at least one data transfer (D) between a portable access device (10) and the vehicle (1).

20 Claims, 3 Drawing Sheets

(56) References Cited

U.S. PATENT DOCUMENTS

2016/0107610 A1\* 4/2016 Lemoult .............. B60R 25/04
                                                340/426.11

FOREIGN PATENT DOCUMENTS

| WO | WO 2015/032956 | 3/2015 |
| WO | WO 2015/084852 | 6/2015 |
| WO | WO 2016/102887 | 6/2016 |
| WO | WO 2018/103939 | 6/2018 |

\* cited by examiner

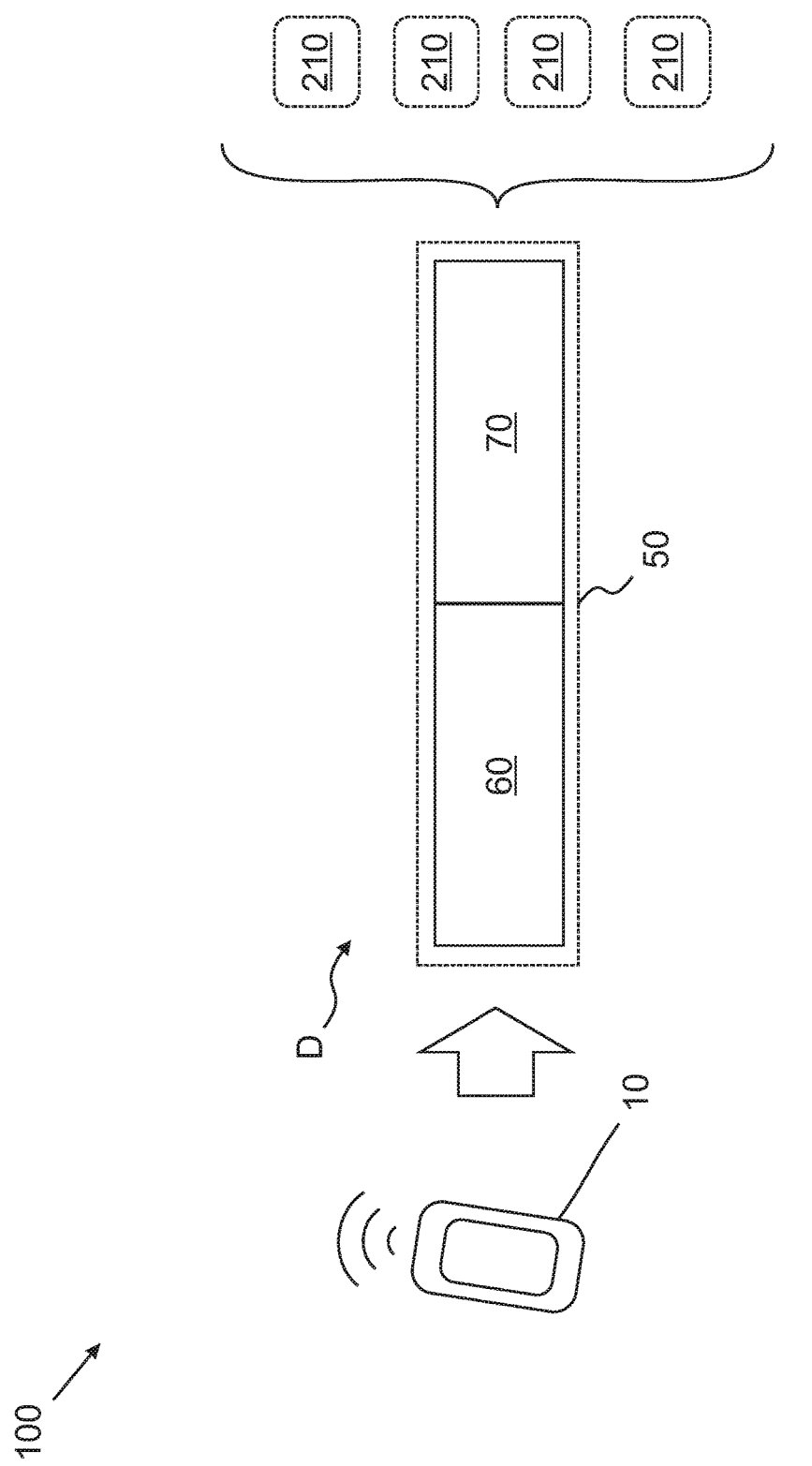

SECURITY METHOD FOR A SECURITY SYSTEM OF A VEHICLE

RELATED APPLICATION

This application claims the benefit of priority of German Patent Application No. 10 2017 105 259.3 filed Mar. 13 2017, the contents of which are incorporated herein by reference in their entirety.

FIELD AND BACKGROUND OF THE INVENTION

The present invention relates to a security method for a security system of a vehicle according to the preamble of the independent method claim. Furthermore, the invention relates to a security system according to the preamble of the independent device claim.

It is known from the prior art that a portable access device, for example a smartphone or an ID transmitter, can be used to activate a security-related function in a vehicle. One such function is, for example, granting access to the vehicle or authorizing engine start. For this purpose, a security system of the vehicle can be provided which, for example, performs and/or evaluates data transfer between the vehicle and the access device. By evaluating the data transfer, for example, a distance of the access device to the vehicle can be measured and/or an approach of the access device can be detected. For example, an activation of the security-related function can only occur when the access device is in the vicinity of the vehicle. This allows, for example, to provide a passive access system (keyless entry system).

Conventional security systems use a "connection-based data transfer" to ensure the security when activating the function. Exemplarily, an authentication can then occur at the connection establishment. In this case, however, the disadvantage has been found that such a data transfer, in particular the connection establishment, can only be performed in a consuming, inflexible and complicated way. Possibly, it may also be a technical challenge to sufficiently limit disconnections and/or connection failures in the case of data transfer involving connections.

In principle, a "connectionless communication" can also be used for data transfer. However, the use of a connectionless data transfer has the disadvantage that the transmitted data packets are not automatically sufficiently protected against manipulation and are usually addressed to all. In other words, the integrity of the transmitted data may not be sufficiently secured or technically complex to ensure. In the case of passive security systems, in particular access systems which use the reception power at the data transfer as an indication of the approach of an access device, this can lead to the wrong device being detected for a distance measurement.

SUMMARY OF THE INVENTION

It is therefore an object of the present invention to at least partially overcome the disadvantages described above. In particular, it is an object of the present invention to provide a more reliable and/or secure authentication and/or distance measurement and/or data transfer in a security system, in particular access system, of a vehicle. Preferably, the possibility of authenticating via the access device in the vehicle (in particular contactless/by radio) should be simplified and improved.

The above object is achieved by a security method having all the features of the independent method claim and by a security system having all the features of the independent system claim. Further features and details of the invention will become apparent from the respective dependent claims, the description and the drawings. In this case, features and details that are disclosed in connection with the security method according to the invention apply, of course, also in connection with the security system according to the invention, and respectively vice versa. Consequently, with respect to the disclosure of the individual aspects of the invention, a mutual reference is or can be made at all times.

The object is achieved in particular by a security method for a security system, in particular access system, of a vehicle, preferably for activating at least one security-related function in the vehicle based on at least one data transfer between a portable access device and the vehicle. For this purpose, for example, the transmitted data and/or further information, such as a signal strength, can be supposed to be evaluated in the data transfer.

In this case, the security-related function can exemplarily comprise at least one of the following functions:
- a release of an access to the vehicle, preferably the activation of a locking system of the vehicle for a user, e.g. unlocking of the vehicle, preferably automatically and/or only if the access device is located within a predetermined maximum distance to the vehicle,
- a release of an engine management system of the vehicle, in particular a release of an engine start, preferably automatically and/or only if the access device and/or the user is located in the interior of the vehicle,
- a deactivation of an alarm system of the vehicle, preferably automatically and/or only if the access device is located within a maximum distance to the vehicle,
- an interlock of the vehicle, in particular automatically and/or only if the access device is located outside a maximum distance to the vehicle.

Preferably, the detection of the approach of the access device and/or the establishment/the performance of the data transfer can be initiated automatically by the vehicle. For this purpose, a wake-up signal can be exemplarily sent out and/or at least one proximity sensor of the vehicle can be evaluated in order to initiate the data transfer. In this way, a passive access system can be provided. Alternatively or additionally, the data transfer can also be initiated by the access device.

It is conceivable that the portable (in particular mobile) access device is designed as an identification transmitter (ID transmitter) and/or as a communication device, such as a smartphone or laptop, in particular a mobile radio communication device, preferably with a mobile radio interface. This enables a comfortable and flexible as well as a cost-effective activation of the function. Preferably for performing the data transfer the access device comprises a radio interface, in particular a Bluetooth interface, preferably a Bluetooth low energy interface.

In this case, the data transfer is preferably performed as a connectionless data transfer between the access device and the vehicle, so that, for example, the data (packets) transmitted thereby are not (necessarily or always) authenticated forgery-proof.

For example, the data transfer is performed as a Bluetooth, in particular Bluetooth low energy, data transfer, in particular in the so-called Bluetooth Advertising Mode (in contrast to connection mode with connection-dependent Bluetooth communication, between at least two predetermined partners/devices). In other words, the data transfer can occur via a broadcasting communication (to anyone or each partner/device). This has the advantage that the data transfer can be performed in a simple and fast manner, in particular without complicated connection establishment.

In the context of the invention it shall be in particular provided that at least one of the following steps is performed, wherein preferably the steps are performed successively or in any order, wherein preferably individual steps can also be performed repeatedly:

a) determining at least one security feature according to a predetermined security mechanism, in particular in and/or by the access device, b) performing the data transfer (in particular via radio), so that (in particular according to the security mechanism) at least one data unit with at least the security feature (and/or user data information) is transmitted from the access device to the vehicle, in particular via an unprotected communication channel, preferably broadcast channel, in particular preferably via radio, preferably unencrypted, c) examining (in particular at least one integrity and/or authenticity) of the transmitted data unit based on the transmitted security feature according to the security mechanism (in particular by the security system, preferably by a processing device, so that the integrity and/or authenticity and/or authorship of the data unit is examined preferably independent of the communication channel) in order to preferably assign the data unit to the access device on-board, so that an examination result is determined, d) activating the security-related function depending on at least the examination result.

The "on-board" assignment is in particular understood to imply that the assignment occurs by the vehicle, in particular by the security system, preferably by vehicle electronics, preferably by an evaluation according to the security mechanism, for example by using a verification key and/or by a comparison of the security feature with at least one default (e.g. an assignment table). In particular, the examining and/or assigning can occur independently of the communication channel, i.e. only based on the data of the data unit received by the vehicle. This has the advantage that, independently of the security precautions in the data transfer as such, i.e. especially in the communication channel, an integrity and authorship of the data unit can be ensured and the data unit can be reliably assigned to the access device.

It may hereby also be possible, that the "on-board" assignment is to be understood as a further communication of the vehicle, in particular via the Internet, for example with a server or another device. From the server or other device, for example, an assignment table can then be retrieved and/or the actual assignment based on the security feature can be made.

It is thereby conceivable that the on-board assignment of the access device based on the (user) data of the data unit can be performed, for example by an evaluation of the security feature and/or at least one of the user data information associated with the security feature. For this purpose, the security feature and/or the user data information for the access device is specific, i.e. allows reliable conclusions about the access device.

Preferably, the security feature can be conducted as an electronic, in particular digital, signature, for example according to a digital signature method (as a security mechanism). The security feature may preferably be specific to the access device and/or the security mechanism, in particular it can be assigned cryptographically fixed to the access device and/or the security mechanism, and is preferably generated based on a secret signature key.

For example, the assignment of the data unit to the access device, i. e. the authorship and integrity of the data unit can be confirmed based on a public verification key (by processing the security feature).

Alternatively or additionally, the security feature can be conducted as a device-specific feature for the access device, i. e. for example as a manufacturer-specific feature or can be determined by such a feature. The feature comprises, for example, manufacturer-specific data of the access device. In particular, the security feature can be generated by applying a randomized encryption algorithm to this data. For example, the data can then be transmitted as user data information of the data unit. In particular, by authenticating this data, the at least one data unit is then to be assigned to a specific access device. Thus, the advantage can be achieved that each data unit has unique data that authenticate the access device forgery-proof. A pretending of an approach can thus be made more difficult since the data unit (in particular packets) cannot be repeated or calculated themselves.

In particular, the data transfer is not performed as a connection-dependent transmission of the data unit, but as a connectionless, and thus preferably also unencrypted, transmission. Concerning the unencrypted transmission, it is to be understood that the communication channel itself is unencrypted (whereas the user data, e.g. at the application level, can be possibly also encrypted or cryptographically secured). In other words, a very flexible and reliable protection of the activation of the function by the security mechanism can occur in that a (preferably cryptographic) backup is provided by the security feature, in particular at the user data or application level.

For example, the security feature and/or user data information that is secured by the security feature can be supposed to be specific to the access device, in particular hardware and/or manufacturer-specific. This allows a device-specific assignment of the data unit, in particular in contrast to a simple connection-dependent transmission of a code. Preferably during examination, not only the content of the user data of the data unit but also the integrity of the data transfer is examined based on the security feature. In other words, it can be examined whether the transmitted data unit originates correctly and unmodified from the authorized access device, and thus data integrity and authenticity are present.

The activation of the function can preferably occur based on the data transfer by evaluating the (user) data and/or information transmitted at the data transfer of the at least one communication interface used for the data transfer. For example, as such information, a signal strength at a receiving interface (i.e., at a receiving node, for example) of the vehicle may be evaluated. In particular, the signal strength can be evaluated such that a distance information about a distance of the vehicle to the access device is determined and/or a localization is performed. This allows, for example, to use the distance information and/or localization for the decision as to whether the security-related function is to be activated or not.

Furthermore, it may be possible for the security mechanism to be conducted as a mechanism for ensuring the security and/or integrity and/or authenticity at the data transfer, and preferably comprises and/or parameterizes a cryptographic signature method for the determination of a digital signature. For example, the security mechanism is specified by the fact that for the security mechanism at least one secret signature key and at least one public verification key and/or a table (assignment table) with device-specific information for different access devices for the determination of authorized access devices is predefined and/or pre-stored, in particular permanently stored in the vehicle. For example, the device-specific information are conducted as hardware codes, so that a comparison of the device-specific information with a transmitted user data information allows an assignment of the data unit to a specific access device. In a further step, the security feature can then be used to evaluate the integrity and/or authenticity of the user data information. Alternatively or additionally, the security feature may already comprise the user data information, so that, for example, a separate transmission of the user data information (in plain text) can be omitted. This is, for example, the case when the user data information is encrypted, and is then transmitted encrypted as a security feature of the data unit. In this case, the guarantee of integrity preferably comprises the examination of the correct content and/or an unmodified state and/or the recognition of modifications and/or the examination of the temporal correctness of the data unit.

It is conceivable that the vehicle is designed as a motor vehicle and/or as an electric vehicle and/or as a hybrid vehicle and/or as an automotive vehicle and/or as a passenger vehicle. In particular, the vehicle comprises at least a part of the security system, for example as an active or passive access system and/or keyless go system or the like.

Moreover, it may be advantageous in the context of the invention that the data transfer is performed unidirectional and/or connectionless via a radio communication technology, in particular via Bluetooth or Bluetooth Low Energy, preferably via a cryptographically unprotected communication channel, so cryptographic protection is provided at least substantially (or predominantly or exclusively) by the security feature and/or the security mechanism. It may be possible that the data transfer occurs connectionless and/or unidirectional, so that preferably the access device as transmitter and the security system on the vehicle, in particular at least one receiving node, as receiver are uncoupled with each other, and/or several receivers can simultaneously (or timely separated) receive the data unit (i.e., same content, possibly timely separated sent further data units). In particular, an unprotected communication channel is to be understood to imply that the communication channel itself (for example, at the transport level or in relation to the control and/or protocol information) is unencrypted or only weakly protected, so that a cryptographic backup is realized primarily via an adaptation of the user data. For example, in this case, the data unit or the user data of the data unit can be transmitted in plain text and/or by broadcast.

It may optionally be possible for the activation of the security-related function according to step d) to occur as a function of at least the examination result and/or a signal strength during the transmission of the data unit, wherein a distance between the access device and the vehicle is preferably determined based on the signal strength, and the security-related function is activated only at a sufficiently small distance. In particular, an examination of the examination result offers the additional security that only an authorized and/or authenticated access device can be used to activate the function at a sufficiently short distance. For example, the signal strength can be determined based on Received Signal Strength Indication (RSSI) data, in particular at a receiving node of the vehicle, which is in particular conducted as a Bluetooth interface.

Moreover, it is advantageous if the data unit comprises at least one user data information, and the data unit is preferably assigned to the access device on-board based on user data information, wherein for cryptographic protection of this assignment the security feature (according to step a)) is preferably determined based on the user data information in order to preferably sign (and/or encrypt) the user data information. In particular, the integrity of the data unit and/or the user data information can then be examined after the data transfer by evaluating the security feature. For example, for this purpose, the security feature can be examined based on a verification key. Alternatively or additionally, the user data information (or the verification key) can also be examined (or decrypted) based on the security feature.

In particular, the security feature can fulfill at least one of the following functions (and, for example, at least one of the following steps can be provided):

Examining the correctness and/or integrity and/or authorship of the user data information, for example by calculating an examination value based on the security feature and/or a verification key, Assigning the user data information and/or the at least one data unit to a specific access device, Verification of the assignment to the effect that the assigned access device is authorized to activate the security-related function, in particular based on an assignment table.

Preferably, the examination value can be correlated with the user data information in such a way that the examination value must have a predetermined result in order to confirm the user data information. For this purpose, for example, a security and/or encryption algorithm can be applied to the user data information and/or the security feature such that the integrity can be examined by comparing the security feature with the user data information.

For example, the security mechanism and/or the examination of the correctness and/or integrity and/or authorship of the user data information and/or examination according to step c) may at least partially comprise the use of a symmetric and/or asymmetric cryptographic method, for example a randomized encryption algorithm and/or an RSA signature method.

It may further be possible for the user data information to comprise at least one device-specific information, in particular a device address of the access device, preferably a Bluetooth device address, wherein the security feature (according to step a)) is preferably determined based on the device-specific information, so that preferably (according to step c)) an authentication of the device-specific information and/or an assignment of the data unit to the access device based on the device-specific information is performed. In particular, the device address or Bluetooth device address is charged with an IRK key (Identity Resolving Key). Preferably, the device-specific information is compared with predetermined information (for example, an assignment table) for the assignment, and only in the case of a match, the examination result is determined to be positive, such that the security-related function can be activated.

Furthermore, it is conceivable that the activation (according to step d)) occurs depending on a localization of the access device based on at least one distance information (such as a signal strength at the data transfer) about a distance of the access device to the vehicle, wherein (before step d)) at least one of the following steps are provided, which are preferably performed successively or in any order (wherein individual steps can also be performed repeatedly):

Digitally signing of user data information for the data unit, so that preferably a digital signature is calculated as a security feature for the data unit, in particular by the access device, Transmission of the data unit, wherein the (signed) user data information and the security feature are transmitted as user data of the data unit from the access device to the vehicle, in particular according to step b), wherein preferably the entire user data and/or the user data information of the data unit are transmitted unencrypted, (this relates in particular only to the transmission, so that in particular the user data or the user data information itself can be encrypted, so that possibly only the transmission occurs unencrypted, but with encrypted content of the user data, i.e., for example, at application level and not on transport or coupling element or interface level encrypted), Determination of the distance information, in particular based on the data transfer, preferably based on a measurement of a signal strength in the data transfer, preferably by the vehicle, wherein preferably (according to step c)) the user data information and/or the distance information are examined based on the security feature, in particular authenticated.

The unencrypted transmission in this case relates in particular only to the data transfer (i.e. in particular to the transport level). It is thus possible that a connectionless transmission can also be used in order to increase the reliability and efficiency of the security system.

According to a further advantage, the security feature and/or the user data information can be supposed to be cryptographically verified (preferably in step c)), preferably based on at least one verification default, such as a verification key, of the security mechanism, preferably by a verification algorithm and/or based on a verification key. In this case, the verification key is preferably pre-stored in the vehicle, for example in a non-volatile data memory of the vehicle. Particularly preferably, the verification key is cryptographically protected in order to prevent manipulation or unauthorized reading.

Furthermore, it can be optionally provided that (in particular according to step c)) a positive examination result is determined if the authenticity of the access device and/or the integrity of the data unit is successfully established based on the transmitted security feature, wherein preferably in step d) the activation (of the security-related function) only occurs if the examination result is positive. This has the advantage that security-critical functions can be provided only for authorized users of the vehicle.

It is further conceivable within the scope of the invention that the at least one data unit is transmitted unencrypted, at least on a transport-oriented level, and thus preferably comprises at least unencrypted control and/or protocol information and/or at least partially unencrypted user data, in particular at least unencrypted user data information, wherein preferably the data unit is conducted as a data packet and preferably the user data comprise at least the unencrypted security feature. In particular, in the case of data transfer, (additional) encryption of the security feature is not necessary (so that it can be present in unencrypted form in the data unit), since the security feature has already been determined by a cryptographic algorithm. This allows to implement a particularly reliable and simpler security examination.

For example, in the case of the data unit and/or for data transfer according to the security mechanism, an encryption occurs on the application-oriented level. This comprises for example an application layer according to the OSI model. The transport-oriented layer comprises, for example, the data link layer or the layers below the application layer or session layer according to the OSI model.

Within the scope of the invention the security mechanism can be provided to comprise at least one cryptographic method for preferably determining at least one assignment, in particular an authenticity, of the data unit (to the access device), wherein preferably the cryptographic method is a digital signature method and/or is performed based on at least one random value and/or rolling code. In this case, the security feature may preferably be conducted as a code according to a rolling-code method. Preferably, in particular based on a shared secret (such as a symmetric key) between transmitter (access device) and receiver (vehicle or receiving node) and a cryptographic algorithm, the transmitter transmits an ever-changing code to the receiver for examination (verification), For example, for this purpose, a so-called Keeloq algorithm is used.

A further advantage may be that the security feature and/or user data information is specific to the access device, in particular in that the security feature and/or user data information is directly or indirectly determined based on device-specific information, in particular a device identifier, preferably an identity resolving key, of the access device. For example, in this case, the device-specific information can be unambiguously assigned to an access device or, in particular, stored permanently in the access device. Thus, the security in the method can be further improved.

It is further conceivable that (in particular at step c)) a localization of the access device, in particular a distance information measured by the data transfer, preferably a measurement result of a distance measurement, preferably a signal strength measurement, is examined, in particular authenticated, based on the security feature, whereby particularly preferably the distance information as at least one user data information of the data unit (in particular at step b)) is transmitted. This allows to easily determine a sufficient proximity of the access device to the vehicle.

In addition, it is optionally possible within the scope of the invention that (in particular according to step a) the determination of the security feature occurs differently for different data units, preferably based on a randomized encryption algorithm and/or a random value and/or a counter and/or the like. Thus, the security for activating the function can be further increased. In particular, the counter can generate a consecutive numbering or the like, in particular by a counter unit (counter), for example to provide a rolling code.

Furthermore, it may be possible that the security-related function comprises at least one first function, in particular a release of access to the vehicle, and/or at least one second function, in particular a release of an engine management system of the vehicle, wherein preferably the first function is only activated, if, based on a localization, a minimum distance of the access device to the vehicle is detected, and preferably the second function is only activated, if, based on the localization, the access device in the interior of the vehicle is detected. This can provide a very convenient way to activate the functions.

In a further possibility it is conceivable that at least two or three or more receiving nodes of the vehicle are provided, preferably for respectively receiving the data unit and/or performing the data transfer, wherein a localization of the access device is performed depending on the reception and/or the data transfer of the receiving nodes and/or an examination of the integrity of each received data units, and preferably the at least one security-related function is activated depending on the localization. For example, the different signal strength signals of the individual receiving nodes can be used to perform a particularly accurate localization of the access device. For this purpose, for example, a triangulation or the like can be used for localization (tracking).

According to a further advantage it can be provided that a localization occurs by a distance measurement, in particular signal strength measurement, based on the data transfer at different receiving nodes of the vehicle, in particular based on the measured distance of the respective receiving node to the access device, wherein preferably the results of the distance measurement are compared for localization. Preferably, alternatively or additional tracking data, for example, by a GPS (Global Positioning System), can be in particular used to increase the tracking accuracy.

It can be provided within the scope of the invention that the data transfer occurs via a public advertising and/or broadcast mode, in particular a Bluetooth communication technology (i.e. also Bluetooth Low Energy), so that the transmitted user data, in particular also the security feature, are publicly evaluable and/or readable, preferably by all receiving nodes of the vehicle. Thus, it is basically conceivable that the transmitted user data of the data unit(s) can be intercepted and read. Here, the security mechanism provides the actual protection to ensure the integrity of the data unit. In particular, the data transfer can occur exclusively unidirectionally.

It is also conceivable that user data information of the data unit comprises at least the security feature and at least one security code for the security system, in particular an access system, wherein the activation according to step d) preferably occurs depending on the security code. In other words, an authentication can occur by the security system using the data unit.

The invention likewise relates to a security system for a vehicle for activating at least one security-related function in the vehicle based on at least one data transfer between a portable access device and the vehicle. The security system according to the invention preferably comprises:
- at least one receiving node on the vehicle, which is conducted to receive at least one data unit by the data transfer,
- at least one processing device which is conducted to examine the (received) data unit in order to assign the data unit to the access device on-board, wherein preferably the processing device is integrated in the vehicle and/or is electrically connected to components of a vehicle electronic and/or part thereof.

In this case, in particular, the examination is supposed to occur based on a security feature of the data unit, and the security-related function can be activated depending on the examination.

Thus, the security system according to the invention contains the same advantages as described in detail with reference to a security method according to the invention. In addition, the security system may be suitable to be operated according to an inventive security method. It is also optionally conceivable that the processing device is conducted to perform a security method according to the invention.

In particular, the at least one receiving node can be arranged on and/or in the vehicle, preferably fixed inseparably. Alternatively or additionally, the receiving nodes can each have at least one antenna, in particular a Bluetooth antenna, and/or in each case be conducted as a Bluetooth interface, preferably a Bluetooth low-energy interface.

Optionally, it can be provided that at least one first receiving node at the rear of the vehicle and/or at least one second receiving node in a door handle of the vehicle and/or at least one third receiving node in the vehicle interior and/or at least a fourth receiving node in the front region of the vehicle are provided, so that preferably depending on a distance between the access device and the respective receiving node a localization of the access device can occur based on the data transfer. Thus a safer way for a contactless activation of the security-related function can be provided by the tracking of the access device.

BRIEF DESCRIPTION OF THE SEVERAL VIEWS OF THE DRAWINGS

Further advantages, features and details of the invention will become apparent from the following description in which, with reference to the drawings, embodiments of the invention are described in detail. The features mentioned in the claims and in the description may each be essential to the invention individually or in any desired combination.

The figures show.

DESCRIPTION OF SPECIFIC EMBODIMENTS OF THE INVENTION

In the following figures, identical reference signs are used for the same technical features of different embodiments.

Figure 1:
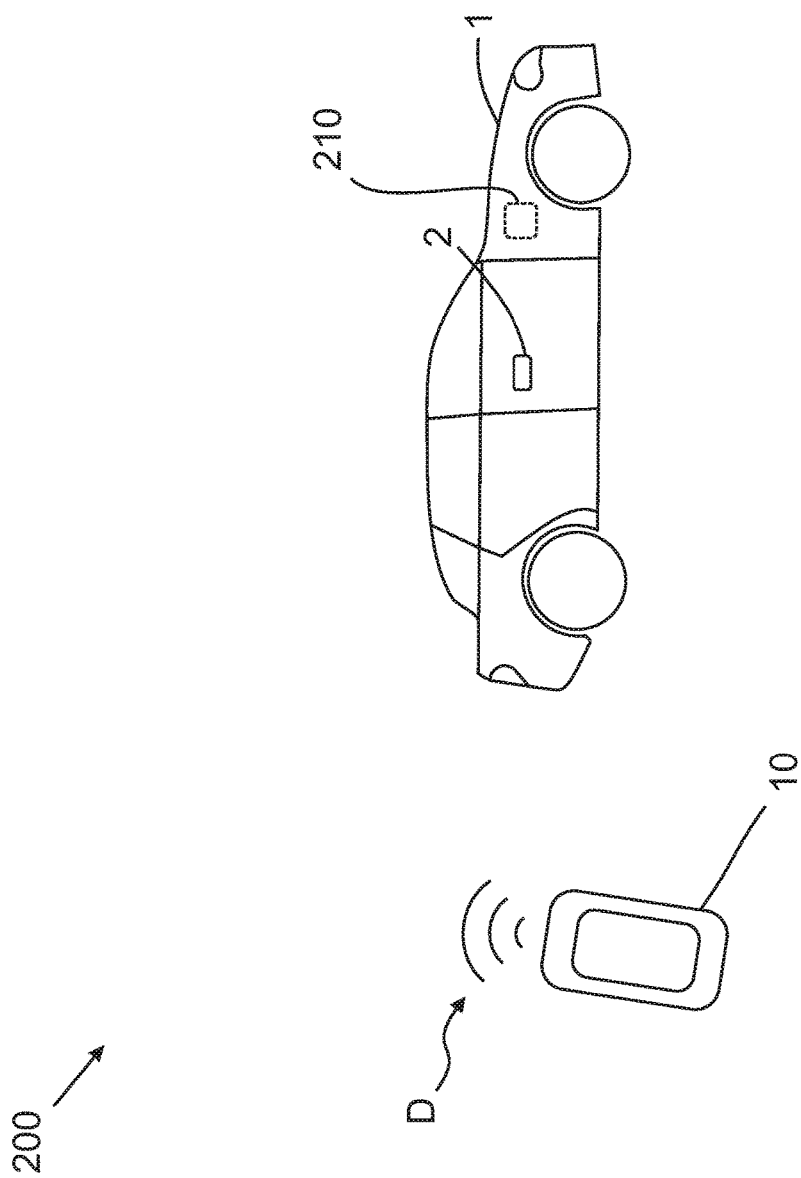
FIG. 1 a schematic view of a security system according to the invention.

FIG. 1 schematically shows a security system 200 according to the invention. In this case, a vehicle 1 is shown, which has at least one receiving node 210 for performing a data transfer D in the vehicle 1.

The data transfer D serves to detect the presence and/or approach of an access device 10 and/or to perform a localization of the access device 10 and/or an authentication. In this way, the access device 10 can be used to activate a security-related function in the vehicle 1. For this purpose, for example, an authorized access device 10 is brought into the vicinity of the vehicle 1.

It can, for example be possible that, as soon as the access device 10 enters the reception range of the vehicle 1 and the at least one receiving node 210, the data transfer D is performed. This data transfer D then serves in particular to transmit at least one data unit 50 from the access device 10 to the vehicle 1. In order to ensure a flexible and simple data exchange and/or communication establishment between the access device 10 and the vehicle 1, the data transfer D is preferably performed unencrypted and/or connectionless.

Figure 2:
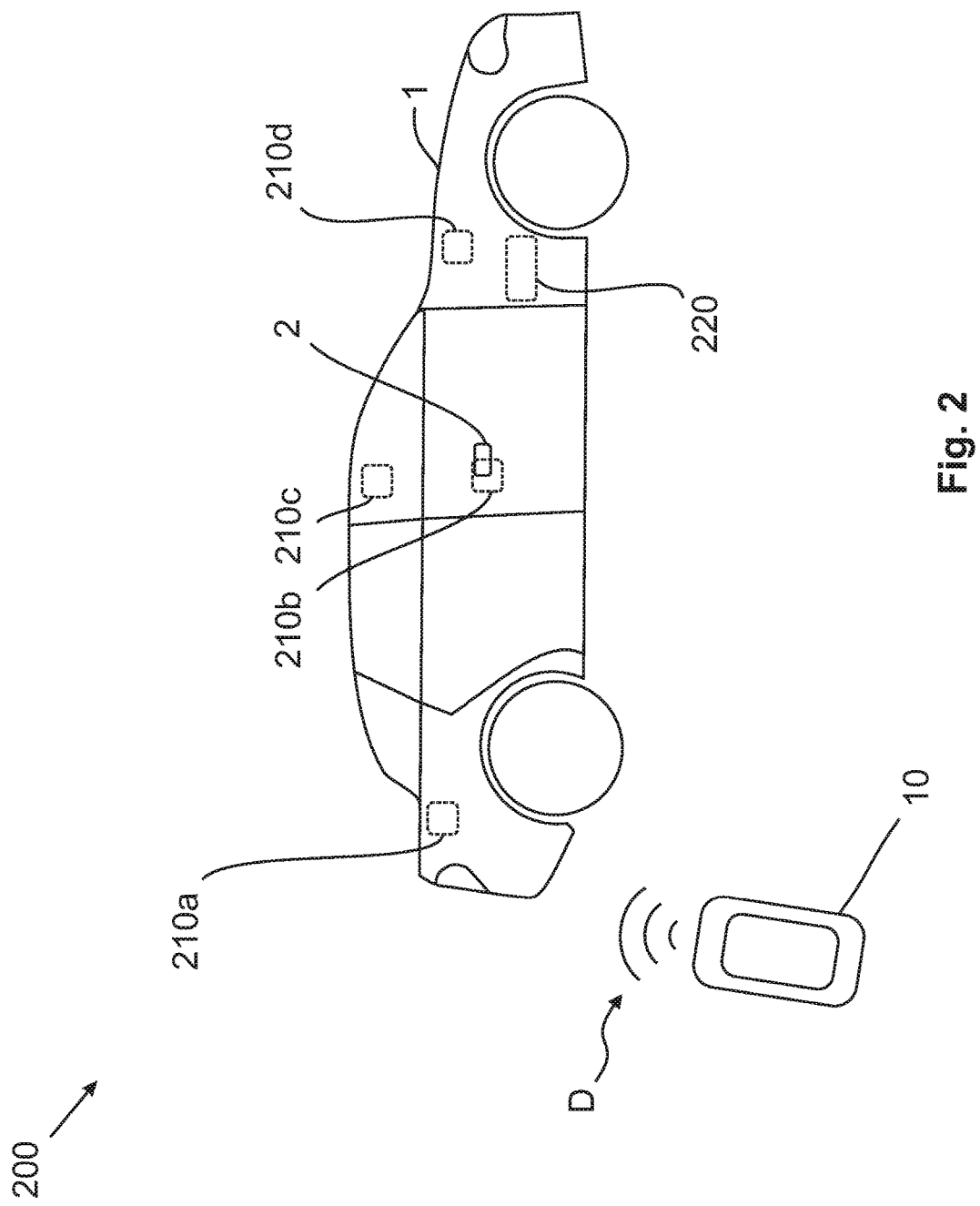
FIG. 2 a further schematic view of a security system according to the invention and FIG. 3 a schematic view of the visualization of a method according to the invention.

FIG. 2 shows that a plurality of receiving nodes 210 of the vehicle 1 can also be provided. For example, at least a first receiving node 210a and/or a second receiving node 210b and/or a third receiving node 210c and/or a fourth receiving node 210d may be attached to different positions of the vehicle 1. Possible positions are, for example, the vehicle interior and/or a door handle 2 and/or a rear area of the vehicle 1. In order to evaluate the transmitted data unit 50, a processing device 220 can be provided, for example. This may, for example, also be suitable for at least partially performing the security method 100 according to the invention, in particular for performing an examination of the data unit 50.

FIG. 3 schematically illustrates a security method 100 according to the invention, in particular by the representative view of a data unit 50. According to a first method step, at least one security feature 60 is determined according to a predetermined security mechanism. According to a second method step, the data transfer D is performed so that at least one data unit 50 with at least the security feature 60 and/or user data information 70 is transmitted from the access device 10 to the vehicle 1. Subsequently, according to a third method step, the transmitted data unit 50 can be examined based on the transmitted security feature 60 according to the security mechanism in order to assign the data unit 50 on-board to the access device 10 so that an examination result is determined. The user data information 70 can also be evaluated as a device-specific information 70 of the data unit 50 in order to determine the examination result and/or to assign the data unit 50 to the access device 10. Further, in particular in order to further increase security, a plurality of receiving nodes 210 of the vehicle 1 can be provided, which can receive the at least one data unit 50. This allows to perform a reliable localization of the access device 10 based on information obtained at the respective receiving node 210 (such as a signal strength of the respective data transfer to the respective receiving node 210). Thus, the security-related function can be activated in a simple and secure manner as a function of at least the examination result.

The above explanation of the embodiments describes the present invention solely in the context of examples. Of course, individual features of the embodiments, if technically feasible, can be combined freely with one another without departing from the scope of the present invention.

LIST OF REFERENCE SIGNS 1 vehicle
2 door handle
10 access device
50 data unit
60 security feature
70 user data information, device-specific information
100 security method
200 security system
210 receiving node
210a first receiving node
210b second receiving node
210c third receiving node
210d fourth receiving node
220 processing device
D data transfer

What is claimed is:

1. Security method for a security system of a vehicle, for activating at least one security-related function in the vehicle based on at least one data transfer between a portable access device and the vehicle,
characterized by the following steps:
a) determining at least one security feature according to a predetermined security mechanism,
b) performing the data transfer so that at least one data unit with at least the security feature is transmitted from the access device to the vehicle,
c) examining of the transmitted data unit based on the transmitted security feature according to the security mechanism in order to assign the data unit to the access device on-board, so that an examination result is determined;
d) activating the security-related function depending on at least the examination result,
wherein the data transfer is performed connectionless via a radio communication technology, namely via a cryptographically unprotected communication channel, so that a cryptographic protection is essentially provided by the security feature and/or the security mechanism.

2. Security method according to claim 1,
wherein
the radio communication technology is Bluetooth or Bluetooth low energy.

3. Security method according to claim 1,
wherein
the activation of the security-related function according to step d) occurs as a function of at least the examination result and a signal strength during the transmission of the data unit, wherein a distance between the access device and the vehicle is determined based on the signal strength, and the security-related function is activated only at a sufficiently small distance.

4. Security method according to claim 1,
wherein
the data unit comprises user data information, and the data unit is assigned to the access device on-board based on the user data information, wherein for cryptographic protection of this assignment the security feature according to step a) is determined based on the user data information in order to sign the user data information.

5. Security method according to claim 1,
wherein
the user data information comprises at least one device-specific information, in particular a device address of the access device, wherein the security feature according to step a) is determined based on the device-specific information, so that according to step c) an authentication of the device-specific information and/or an assignment of the data unit to the access device based on the device-specific information is performed.

6. Security method according to claim 1,
wherein
the activation according to step d) occurs depending on a localization of the access device based on distance information about a distance of the access device to the vehicle, wherein before step d) at least the following steps are provided:
Digitally signing of user data information for the data unit so that a digital signature is calculated as security feature for the data unit, in particular by the access device,
Transmission of the data unit, wherein the user data information and the security feature are transmitted as user data of the data unit from the access device to the vehicle, in particular according to step b), wherein the entire user data and/or the user data information of the data unit are transmitted unencrypted,
Determination of the distance information, in particular based on the data transfer, based on a measurement of a signal strength in the data transfer by the vehicle,
wherein according to step c) the user data information and/or the distance information are examined, in particular authenticated, based on the security feature.

7. Security method according to claim 1,
wherein
in step c) the security feature and/or the user data information is cryptographically verified, based on at least one verification default of the security mechanism.

8. Security method according to claim 1,
wherein
according to step c), a positive examination result is determined if the authenticity of the access device and/or the integrity of the data unit is successfully established based on the transmitted security feature, wherein in step d) the activation only occurs, if the examination result is positive.

9. Security method for a security system of a vehicle, for activating at least one security-related function in the vehicle based on at least one data transfer between a portable access device and the vehicle,
characterized by the following steps:
a) determining at least one security feature according to a predetermined security mechanism,
b) performing the data transfer so that at least one data unit with at least the security feature is transmitted from the access device to the vehicle,
c) examining of the transmitted data unit based on the transmitted security feature according to the security mechanism in order to assign the data unit to the access device on-board, so that an examination result is determined;
d) activating the security-related function depending on at least the examination result
wherein
the data unit is transmitted unencrypted, at least on a transport-oriented level, and thus comprises at least unencrypted control and/or protocol information and/or at least partially unencrypted user data, in particular at least unencrypted user data information, wherein the data unit is conducted as a data packet, and the user data comprise at least the unencrypted security feature.

10. Security method for a security system of a vehicle, for activating at least one security-related function in the vehicle based on at least one data transfer between a portable access device and the vehicle,
characterized by the following steps:
a) determining at least one security feature according to a predetermined security mechanism,
b) performing the data transfer so that at least one data unit with at least the security feature is transmitted from the access device to the vehicle,
c) examining of the transmitted data unit based on the transmitted security feature according to the security mechanism in order to assign the data unit to the access device on-board, so that an examination result is determined;
d) activating the security-related function depending on at least the examination result;
wherein
the security mechanism comprises at least one cryptographic method for determining at least one assignment, in particular an authenticity, of the data unit, wherein the cryptographic method is a digital signature method and/or is performed based on at least one random value and/or rolling code.

11. Security method according to claim 1,
wherein
the security feature and/or user data information is specific to the access device, in particular in that the security feature and/or the user data information is directly or indirectly determined based on device-specific information, in particular a device identifier, of the access device.

12. Security method according to claim 1,
wherein
at least two or three or more receiving nodes of the vehicle are provided for respectively receiving the at least one data unit and/or performing the data transfer, wherein a localization of the access device is performed depending on the reception and/or the data transfer of the receiving nodes and/or an examination of the integrity of each received data units, and the at least one security-related function is activated depending on the localization.

13. Security method according to claim 1,
wherein
a localization occurs by a distance measurement, in particular signal strength measurement, based on the data transfer at different receiving nodes of the vehicle, in particular based on the measured distance of the respective receiving node to the access device, wherein the results of the distance measurement are compared for localization.

14. Security method for a security system of a vehicle, for activating at least one security-related function in the vehicle based on at least one data transfer between a portable access device and the vehicle,
characterized by the following steps:
a) determining at least one security feature according to a predetermined security mechanism,
b) performing the data transfer so that at least one data unit with at least the security feature is transmitted from the access device to the vehicle,
c) examining of the transmitted data unit based on the transmitted security feature according to the security mechanism in order to assign the data unit to the access device on-board, so that an examination result is determined;
d) activating the security-related function depending on at least the examination result;
wherein
the data transfer occurs via a public advertising and/or broadcast mode, in particular a Bluetooth communication technology, so that the transmitted data units and/or user data, in particular also the security feature, are publicly evaluable and/or readable, by all receiving nodes of the vehicle.

15. Security system for a vehicle for activating at least one security-related function in the vehicle based on at least one data transfer between a portable access device and the vehicle, comprising:
at least one receiving node on the vehicle, which is conducted to receive at least one data unit by the data transfer,
at least one processing device which is conducted to examine the received data unit in order to assign the data unit to the access device on-board,
wherein the examination occurs based on a security feature and/or a security mechanism of the data unit, and the security-related function can be activated depending on the examination, and wherein the data transfer is performed connectionless via a radio communication technology, namely via a cryptographically unprotected communication channel, so that a cryptographic protection is essentially provided by the security feature and/or the security mechanism.

16. Security system according to claim 15,
wherein
at least one first receiving node at the rear of the vehicle and/or at least one second receiving node in a door handle of the vehicle and/or at least one third receiving node in the vehicle interior and/or at least one fourth receiving node in the front region of the vehicle are provided, so that depending on a distance between the access device and the respective receiving node a localization of the access device can occur based on the data transfer.

17. Security system according to claim 15, wherein
the processing device is conducted to perform a security method comprising
   a) determining the security feature according to the security mechanism,
   b) performing the data transfer so that the data unit with at least the security feature is transmitted from the access device to the vehicle,
   c) examining of the transmitted data unit based on the transmitted security feature according to the security mechanism in order to assign the data unit to the access device on-board, so that an examination result is determined; and
   d) activating the security-related function depending on at least the examination result.

18. Method according to claim 5, wherein the device address is a Bluetooth device address.

19. Method according to claim 7, wherein in step c) the security feature and/or the user data information is cryptographically verified by a verification algorithm and/or based on a verification key.

20. Method according to claim 11, wherein the device identifier is an identity resolving key.

* * * * *